No. 689,911.  
E. W. T. RICHMOND.  
GAS COOKING APPARATUS.  
(Application filed Dec. 29, 1900.)  
Patented Dec. 31, 1901.
(No Model.)  
4 Sheets—Sheet 1.
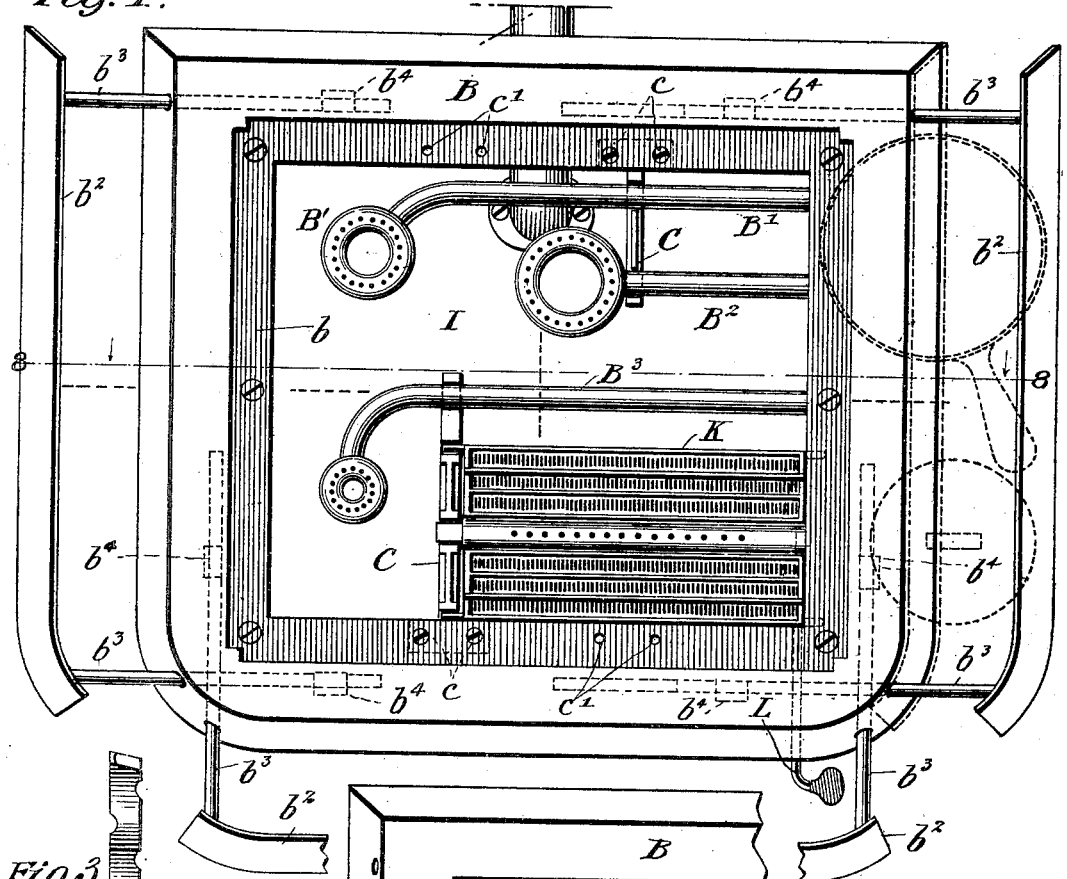
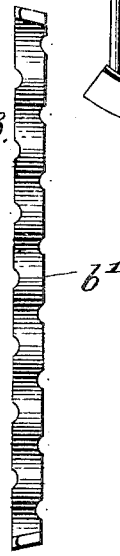
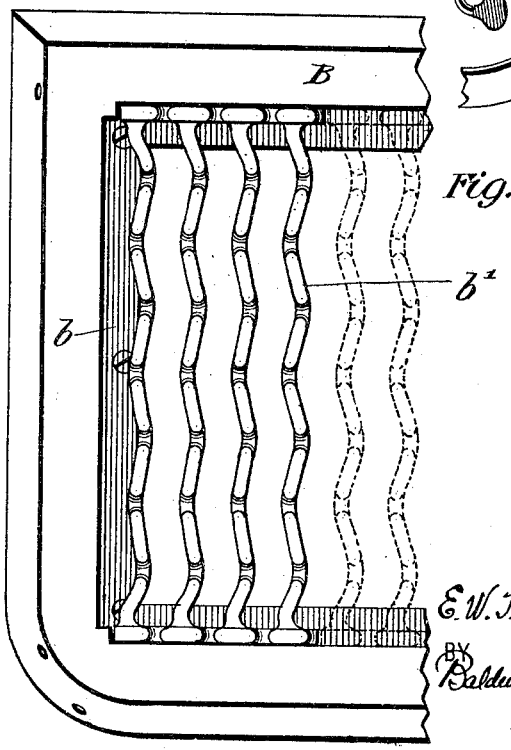
WITNESSES:  
W. W. Harrison  
C. D. Ladley
INVENTOR  
E. W. T. Richmond  
BY  
Baldwin, Davidson & Wight  
ATTORNEYS No. 689,911. Patented Dec. 31, 1901.
E. W. T. RICHMOND.
GAS COOKING APPARATUS.
(Application filed Dec. 29, 1900.)
(No Model.) 4 Sheets—Sheet 2.

WITNESSES: W. W. Harrison. C. D. Radley.

INVENTOR E. W. T. Richmond
BY Baldwin, Davidson & Wight
ATTORNEYS

No. 689,911. Patented Dec. 31, 1901.
E. W. T. RICHMOND.
GAS COOKING APPARATUS.
(Application filed Dec. 29, 1900.)
(No Model.) 4 Sheets—Sheet 3.
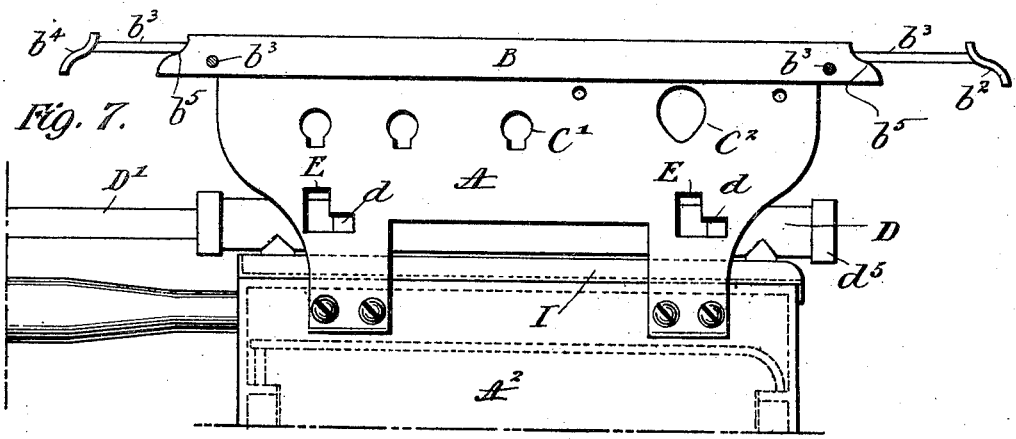
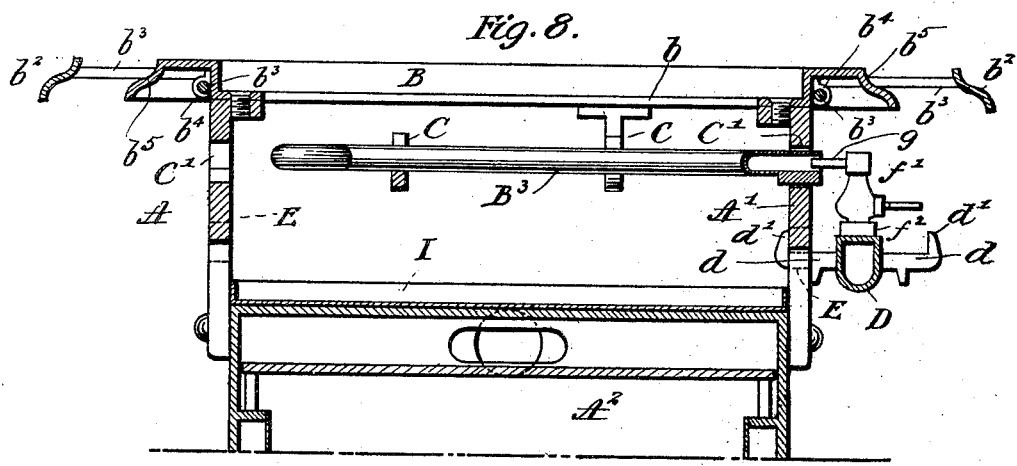
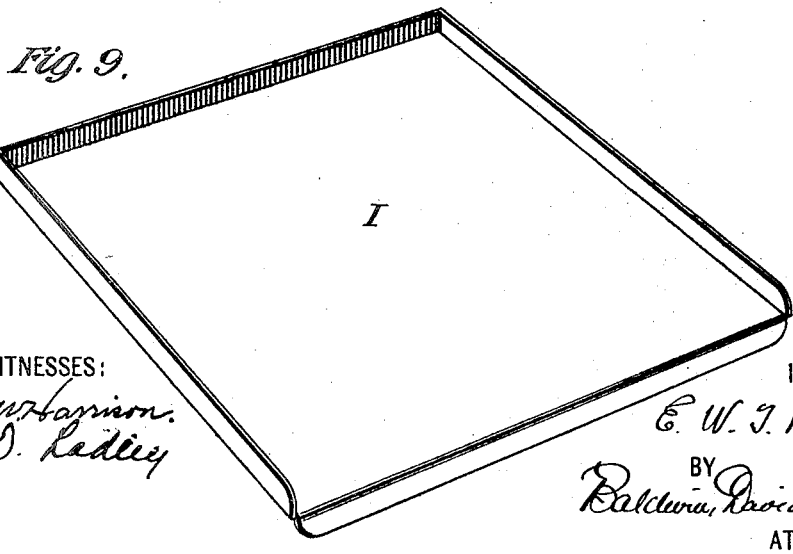
WITNESSES:
W. W. Harrison.
C. D. Ladley.
INVENTOR
E. W. T. Richmond
BY
Baldwin, Davidson & Wight
ATTORNEYS
THE NORRIS PETERS CO., PHOTO-LITHO., WASHINGTON, D. C.

No. 689,911. Patented Dec. 31, 1901.
E. W. T. RICHMOND.
GAS COOKING APPARATUS.
(Application filed Dec. 29, 1900.)
(No Model.) 4 Sheets—Sheet 4.
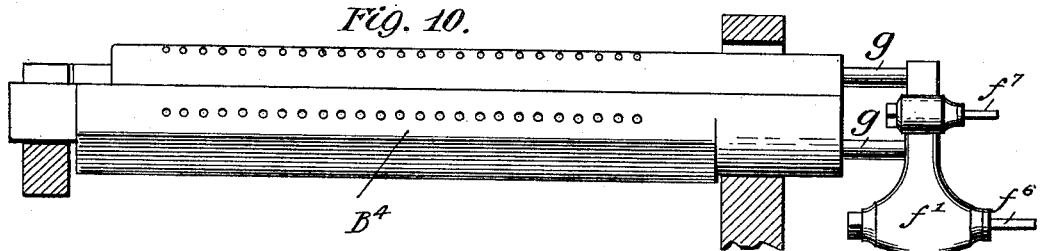
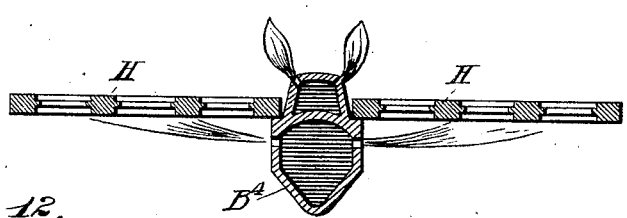
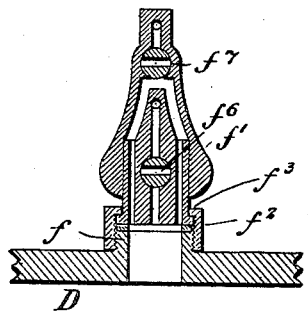
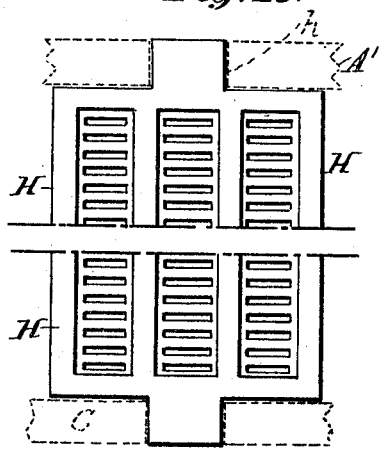
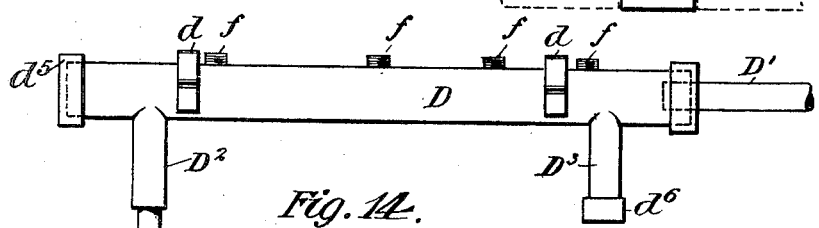
WITNESSES:  
INVENTOR  
E. W. T. Richmond  
BY  
ATTORNEYS

UNITED STATES PATENT OFFICE.

EDMOND W. T. RICHMOND, OF ROMFORD, ENGLAND.

GAS COOKING APPARATUS.

SPECIFICATION forming part of Letters Patent No. 689,911, dated December 31, 1901.

Application filed December 29, 1900. Serial No. 41,528. (No model.)

*To all whom it may concern:*

Be it known that I, EDMOND W. T. RICHMOND, a subject of the Queen of Great Britain, residing at Summercourt, Romford, Essex county, England, have invented certain new and useful Improvements in Gas Cooking Apparatus, of which the following is a specification.

This invention relates particularly to that part of a gas cooking apparatus known as the "hot-plate;" and the object of the invention is to improve the general construction of this part of the cooker and to provide improved means for grilling and boiling and novel devices whereby certain parts of the apparatus may be reversed—*i. e.*, transferred from one side of the cooker to the other.

Figure 5:
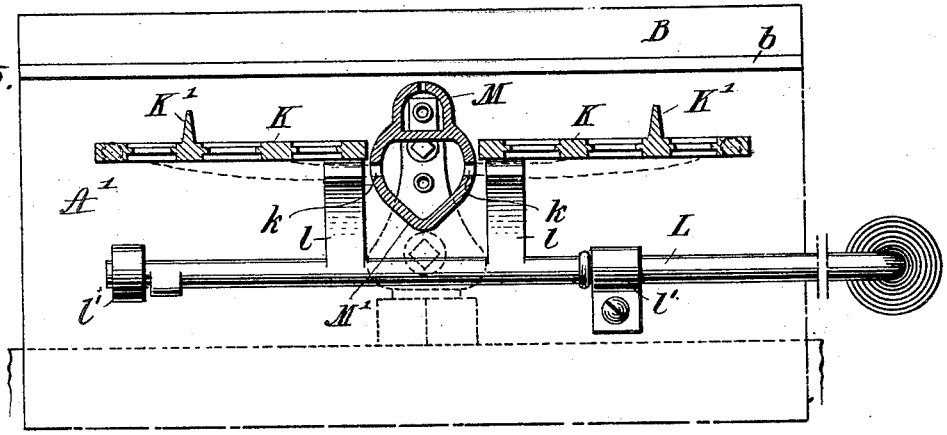
Figure 6:
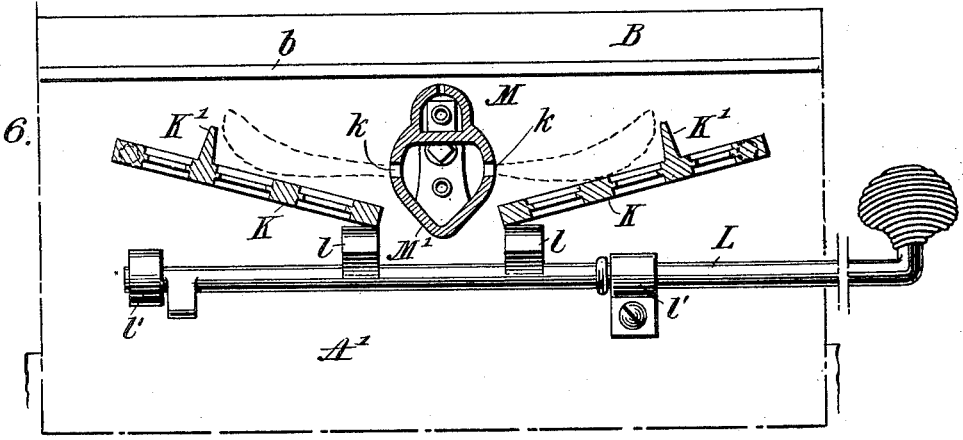
Figure 4:
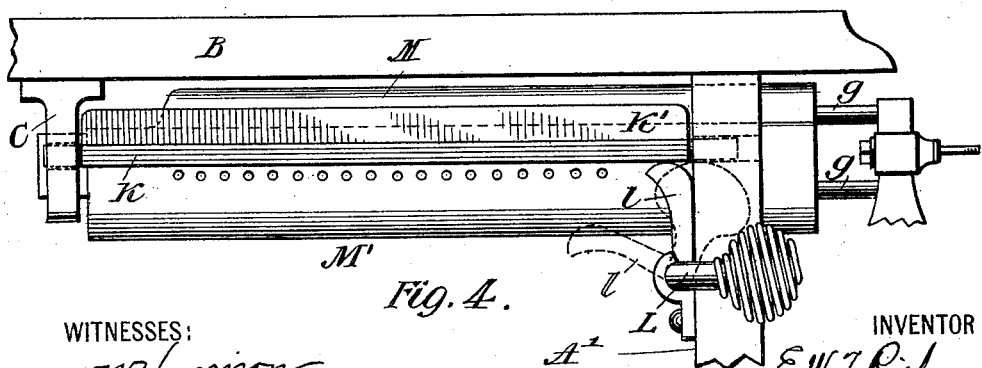

In the accompanying drawings, Figure 1 is a top plan view of my improved hot-plate, with the bars which support the cooking utensils removed. Fig. 2 is a detail top plan view of a portion of the hot-plate, showing particularly the manner in which the bars are supported. Fig. 3 is a side view of one of the bars. Figs. 4, 5, and 6 are on an enlarged scale. Fig. 4 is a view of the grilling-burner preferably employed and some of the parts connected therewith. Fig. 5 shows a cross-section through the preferred form of grilling apparatus, the grilling-plates being in an elevated or horizontal position for grilling. Fig. 6 is a similar view showing the grilling-plates depressed for boiling. Fig. 7 shows a left-side elevation of the hot-plate. Fig. 8 shows a vertical section on the line 8 8 of Fig. 1 looking in the direction of the arrows, some of the parts being omitted, and this figure also shows the upper part of the cooker. Fig. 9 is a perspective view of a drip-tray placed on the top of the oven below the hot-plate. Fig. 10 is a view, on an enlarged scale, of a grilling-burner that may be employed, together with some of the devices for supplying gas thereto. Fig. 11 shows a transverse section of one form of grilling apparatus that may be used. Fig. 12 is a view, on an enlarged scale and in vertical section, showing the manner of attaching the gas-cocks to the gas-bar. Fig. 13 is a plan view, with parts broken away, of one form of grilling-plate; and Fig. 14 is a view of the gas-bar and some of its connections.

A A' are brackets mounted over and at the opposite side edges of the oven portion $A^2$ of the gas-cooker and supporting an open rectangular horizontal frame B, provided with burners $B'$ $B^2$, &c., which are removably mounted in the frame. A countersunk ledge $b$ around the inner edge of the frame B receives the removable bars $b'$, which may be such as shown, or they may be of any suitable pattern, upon which the cooking utensils may rest. At the sides and front of the frame B are extension-bars $b^2$, carried by rods $b^3$, sliding in apertures in the frame B and in lugs $b^4$ on the under face thereof. Since the outer edges of the frame B are curved in cross-section and are formed with recesses $b^5$, the extension-bars $b^2$ are preferably shaped to conform to such recesses, so that when pushed in they will not detract from the appearance of the apparatus. When drawn out, they enlarge the surface of the hot-plate available for the reception of utensils, as indicated.

The several burners $B'$ $B^2$, &c., rest upon brackets C, projecting from the frame B, and at their outer ends they rest in apertures $C'$ $C^2$, formed in the side brackets A A'. These apertures are correspondingly formed in both side brackets, and the frame B is provided with two points of attachment $c$ $c'$ for each burner-bracket C to permit of all the burners being reversed from the right to the left ide of the frame or stove.

The gas-bar D, which is a cored casting, has one end closed by a removable cap $d^5$, and the gas-supply pipe D' is connected to the opposite end of the casting. From each side of the gas-bar project two horizontal arms $d$, having at their ends upwardly-extending parts $d'$. In each side bracket are two L-shaped slots E. To attach the gas-bar to the side, the parts $d'$ are passed through the vertical parts of the slots E and the bar D is then moved endwise to bring the parts $d$ into the horizontal parts of the slots.

The gas-bar may be attached at either side of the hot-plate, all the burners being correspondingly reversed, as presently described, in order to adapt the burner to the position in which the cooker is mounted relatively to the gas-supply connections. To permit of reversal of the gas-bars and also to afford access to the jets or nozzles supplying gas to the open ends of the burners lying in the apertures C' C², hollow hubs $f$ are formed on the top of the gas-bar, on the threaded tops of which are seated the flanged ends of the gas-cocks $f'$. A nut $f^2$, screwing on each hub, has an inwardly-projecting flange $f^3$, that bears upon the flange of the gas-cock and clamps it in position against the face of the hub. From the upper ends of the gas-cocks project laterally the gas-jets $g$, which discharge gas into the open ends of the burners. The jets $g$ may be cast in one piece with the cocks or they may be separately formed and attached. Should a jet become fouled by deposit from the gas, the nut $f^3$ may be loosened, the cock turned around, and the jet cleaned. When the gas-bar is reversed or shifted to the opposite side of the stove, the several jets may be correspondingly reversed to adapt them to their new position.

To provide for the gas connections to the oven-burners, the gas-bars may be formed with two downwardly-extending connections D² D³, Fig. 14, one of which may be closed by a screw-cap $d^6$, as shown, and the pipe supplying the oven-burners connected with the other one. If there be but one of such connections, then when the gas-bar is at one side of the hot-plate the oven connections should be located near the front of the stove and when at the other side near the rear of the stove.

The annular burners B' B³ have hollow supporting and gas and air supplying bars or shanks curved at their outer ends for the purpose of bringing the burners to their appropriate places in the frame or hot-plate. It is necessary or desirable to provide right and left hand burners B' B³. By the devices described the gas-bar may be placed on either the right or left hand side of the stove to provide for variations in the gas-supply connections at various places, and the burners may be correspondingly changed.

Gas-cooker hot-plates are usually provided with grilling devices. In Figs. 10, 11, and 13 one form of grilling device is shown. In this instance a straight or bar burner B⁴ is provided having upper and lower chambers, respectively, having appropriate nipples or apertures. For this burner there is an open gas-cock $f'$, Figs. 10 and 12, having two plugs or valves $f^6 f^7$, so that gas may be fed at will to both chambers of the burner or to either one, two jets $g$ being provided, as indicated. Fig. 12 serves to illustrate the construction of the gas-cocks whether adapted to supply a burner having one chamber or two. Grill-plates H of ordinary construction, one on each side of the burner and in a plane between the two series of apertures, are mounted at one end in one of the brackets C and at the other end in apertures $h$, Fig. 13, in one of the side brackets, and they also rest upon shoulders formed on the burner B⁴.

A tray I, having an enameled surface, preferably white, with upwardly-extending rear and side flanges and a downwardly-extending front flange, fits between the side brackets A A' and completely covers and protects the top of the oven-casing, on which it rests.

I prefer to employ a grilling device of the construction shown in Figs. 1, 4, 5, and 6. In this form of apparatus the grilling-plates K are pivoted near their outer edges to one of the brackets C and to one of the side brackets A A', and by means of the lever L, constructed and arranged in the manner shown or in any suitable manner, the plates may be rocked to bring their inner edges above the nipples or apertures $k$ for grilling, as shown in Fig. 5, while for boiling the plates may be depressed, as shown in Fig. 6, in which position the lateral jets of flame from the burners will pass across the upper surfaces of the plates and then upwardly by impinging against a vertical flange or rib $k'$, extending lengthwise across the upper face of each plate, as indicated in Fig. 6. The lever L is shown as consisting of a rock-shaft mounted in perforated lugs $l'$ on one of the side brackets and having a handle $l^2$ located near the front left-hand corner of the stove. The rock-shaft is provided with arms $l$, which engage the inner ends of the plates K and support these plates in both their elevated and depressed positions. In Figs. 5 and 6 I have shown the plates K coöperating with a double burner similar to that shown in Fig. 11 and already described. In this case, however, I make the upper part M of the burner of smaller dimensions and supply it with a less quantity of mixed air and gas, this part of the burner furnishing a slight flame for slow cooking or simmering, and during its operation grilling may be done with the plates and lower part M' of the burner, which is of considerably greater capacity. Should an intense boiling-flame be desired, the grilling-plates may be depressed and both parts of the burner used in conjunction. The two parts of the burner which are designated M M' are really two separate burners and may be so considered. I have shown and described them as above merely because to combine the two burners in one casting is a convenient, suitable, and practicable way of making them, as the two require but one means of support in the hot-plate. The pivoted grill-plates and their burner or burners as well as the grill-plate-operating lever may be reversed when the gas-bar is shifted.

I claim as my invention—

1. A gas-cooker, comprising a hot-plate or open frame, the supporting side brackets having a corresponding series of burner-apertures, burners detachably mounted in the frame, a reversible gas-bar, means for detachably connecting it with either bracket, and reversible gas cocks and jets mounted on the gas-bar.

2. The combination with a gas-cooker, of a detachable gas-bar provided with arms projecting laterally from opposite sides of it, and a hot-plate having brackets on each side each of which is provided with apertures to receive said arms whereby the gas-bar may be detachably connected with either side of the hot-plate.

3. The combination of the side brackets of the hot-plate, the gas-bar having arms adapted to connect therewith either of said brackets, reversible gas cocks and jets mounted on the gas-bar, the detachable burners receiving gas from the gas-jets and devices for supporting said burners so that they may project from either of said side brackets.

4. A gas-cooker comprising an oven-casing, a hot-plate mounted above it and comprising an open frame with vertical side brackets, burners in the hot-plate and a detachable enameled tray placed under the burners of the hot-plate between the vertical brackets, covering the top of the oven-casing and having upwardly-projecting flanges on three sides, and a downwardly-projecting flange at the front.

In testimony whereof I have hereunto subscribed my name.

EDMOND W. T. RICHMOND.

Witnesses:
 KATHARINE MACMAHON,
 EDWARD C. DAVIDSON.